(12) United States Patent
Hu et al.

(10) Patent No.: US 8,554,806 B2
(45) Date of Patent: Oct. 8, 2013

(54) CROSS PLATFORM TRANSPORTABLE TABLESPACES

(75) Inventors: Wei Hu, Palo Alto, CA (US); Alexander Hwang, Orinda, CA (US); Shen-Ban Meng, Sunnyvale, CA (US); Alok Pareek, Brisbane, CA (US); Dmitry Potapov, Emerald Hills, CA (US); Francisco Sanchez, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1815 days.

(21) Appl. No.: 10/966,679

(22) Filed: Oct. 14, 2004

(65) Prior Publication Data

US 2005/0253739 A1    Nov. 17, 2005

Related U.S. Application Data

(60) Provisional application No. 60/571,088, filed on May 14, 2004.

(51) Int. Cl.
*G06F 7/00* (2006.01)
*G06F 17/30* (2006.01)

(52) U.S. Cl.
USPC ............ 707/809; 707/803; 707/802; 707/790

(58) Field of Classification Search
USPC ........................................ 707/3, 10, 100, 204
See application file for complete search history.

(56) References Cited

U.S. PATENT DOCUMENTS

| | | |
|---|---|---|
| 4,930,071 A | 5/1990 | Tou et al. |
| 5,222,235 A | 6/1993 | Hintz et al. |
| 5,278,978 A | 1/1994 | Demers et al. |
| 5,396,623 A | 3/1995 | McCall et al. |
| 5,454,101 A | 9/1995 | Mackay et al. |
| 5,551,020 A | 8/1996 | Flax et al. |
| 5,579,516 A | 11/1996 | Van Maren et al. |
| 5,687,343 A | 11/1997 | Fecteau et al. |

(Continued)

FOREIGN PATENT DOCUMENTS

| | | |
|---|---|---|
| EP | 0 942 363 A2 | 9/1999 |
| EP | 0 992 909 A2 | 4/2000 |

(Continued)

OTHER PUBLICATIONS

Claus Hagen, et al., "Highly Available Process Support Systems: Implementing Backup Mechanisms," 1999, IEEE, pp. 112-121.

(Continued)

*Primary Examiner* — Jau-Shya Meng
(74) *Attorney, Agent, or Firm* — Hickman Palermo Truong Becker Bingham Wong LLP (57) ABSTRACT

Stored data are transported between different systems having different platforms by converting the format of the stored data into a common format either before or after transmitting the stored data from the source database system to the target database system. The common format may be a format that is universal in that the common format is not machine dependent. The stored data may be kept in the common format at the target database system and never converted to another format. Optionally, the stored data may be converted from the common format to a format associated with the target database system, thereby facilitating backward compatibility. A tool may be provided for performing the conversion.

14 Claims, 3 Drawing Sheets

(56) References Cited

U.S. PATENT DOCUMENTS

| | | | |
|---|---|---|---|
| 5,692,174 A | 11/1997 | Bireley et al. | |
| 5,758,345 A | 5/1998 | Wang | |
| 5,781,911 A | 7/1998 | Young et al. | |
| 5,787,445 A | 7/1998 | Daberko | |
| 5,787,446 A | 7/1998 | Dang et al. | |
| 5,819,298 A | 10/1998 | Wong et al. | |
| 5,864,853 A | 1/1999 | Kimura et al. | |
| 5,870,746 A | 2/1999 | Knutson et al. | |
| 5,890,167 A * | 3/1999 | Bridge et al. | 707/999.101 |
| 5,890,169 A | 3/1999 | Wong et al. | |
| 5,924,097 A | 7/1999 | Hill et al. | |
| 5,937,408 A | 8/1999 | Shoup et al. | |
| 5,943,677 A | 8/1999 | Hicks | |
| 5,951,694 A | 9/1999 | Choquier et al. | |
| 5,970,502 A | 10/1999 | Salkewicz et al. | |
| 5,991,753 A | 11/1999 | Wilde | |
| 6,014,614 A | 1/2000 | Herring et al. | |
| 6,014,670 A | 1/2000 | Zamanian et al. | |
| 6,032,158 A | 2/2000 | Mukhopadhyay et al. | |
| 6,035,379 A | 3/2000 | Raju et al. | |
| 6,035,412 A | 3/2000 | Tamer et al. | |
| 6,041,357 A | 3/2000 | Kunzelman et al. | |
| 6,044,374 A | 3/2000 | Nesamoney et al. | |
| 6,088,728 A | 7/2000 | Bellemore et al. | |
| 6,098,076 A | 8/2000 | Rekieta et al. | |
| 6,101,497 A | 8/2000 | Ofek | |
| 6,108,657 A | 8/2000 | Shoup et al. | |
| 6,108,748 A | 8/2000 | Ofek et al. | |
| 6,122,636 A | 9/2000 | Malloy et al. | |
| 6,151,601 A | 11/2000 | Papierniak et al. | |
| 6,151,608 A | 11/2000 | Abrams | |
| 6,208,990 B1 | 3/2001 | Suresh et al. | |
| 6,222,840 B1 | 4/2001 | Walker et al. | |
| 6,233,537 B1 | 5/2001 | Gryphon et al. | |
| 6,249,786 B1 | 6/2001 | Wadewitz | |
| 6,272,503 B1 | 8/2001 | Bridge, Jr. et al. | |
| 6,339,775 B1 | 1/2002 | Zamanian et al. | |
| 6,434,558 B1 | 8/2002 | MacLeod et al. | |
| 6,442,568 B1 | 8/2002 | Velasco et al. | |
| 6,442,663 B1 | 8/2002 | Sun et al. | |
| 6,442,748 B1 | 8/2002 | Bowman-Amuah | |
| 6,453,038 B1 | 9/2002 | McFarlane et al. | |
| 6,484,179 B1 | 11/2002 | Roccaforte | |
| 6,490,590 B1 | 12/2002 | Fink | |
| 6,516,326 B1 * | 2/2003 | Goodrich et al. | 707/602 |
| 6,549,922 B1 | 4/2003 | Srivastava et al. | |
| 6,604,104 B1 | 8/2003 | Smith | |
| 6,604,110 B1 | 8/2003 | Savage et al. | |
| 6,611,838 B1 | 8/2003 | Ignat et al. | |
| 6,643,652 B2 | 11/2003 | Helgeson et al. | |
| 6,691,155 B2 | 2/2004 | Gottfried | |
| 6,694,306 B1 | 2/2004 | Nishizawa et al. | |
| 6,694,505 B1 | 2/2004 | Tan | |
| 6,757,689 B2 | 6/2004 | Battas et al. | |
| 6,785,673 B1 * | 8/2004 | Fernandez et al. | 707/3 |
| 6,792,431 B2 | 9/2004 | Tamboli et al. | |
| 6,839,724 B2 | 1/2005 | Manchanda et al. | |
| 6,978,282 B1 | 12/2005 | Dings et al. | |
| 6,993,657 B1 | 1/2006 | Renner et al. | |
| 6,996,566 B1 | 2/2006 | George et al. | |
| 7,058,615 B2 | 6/2006 | Yao | |
| 7,058,958 B1 | 6/2006 | Shutt et al. | |
| 7,139,779 B1 | 11/2006 | Kornelson et al. | |
| 7,139,979 B1 | 11/2006 | Schultz et al. | |
| 7,143,112 B2 | 11/2006 | Yagawa | |
| 7,254,590 B2 | 8/2007 | Mudunuri et al. | |
| 7,299,216 B1 | 11/2007 | Liang et al. | |
| 7,487,168 B2 | 2/2009 | Rys et al. | |
| 7,512,614 B2 | 3/2009 | Yao | |
| 7,596,573 B2 | 9/2009 | O'Neil et al. | |
| 2001/0047270 A1 | 11/2001 | Gusick et al. | |
| 2002/0073139 A1 | 6/2002 | Hawkins et al. | |
| 2002/0091702 A1 | 7/2002 | Mullins | |
| 2002/0143733 A1 | 10/2002 | Mukkamalla et al. | |
| 2002/0156796 A1 | 10/2002 | Hisamatsu et al. | |
| 2002/0161896 A1 | 10/2002 | Wen et al. | |
| 2002/0169745 A1 | 11/2002 | Hotti et al. | |
| 2003/0005028 A1 | 1/2003 | Dritschler et al. | |
| 2003/0014523 A1 | 1/2003 | Teloh et al. | |
| 2003/0140055 A1 | 7/2003 | Doney et al. | |
| 2003/0172158 A1 | 9/2003 | Pillai et al. | |
| 2003/0208505 A1 | 11/2003 | Mullins et al. | |
| 2003/0212789 A1 | 11/2003 | Hamel et al. | |
| 2003/0236834 A1 | 12/2003 | Gottfried | |
| 2004/0024979 A1 | 2/2004 | Kaminsky et al. | |
| 2004/0034615 A1 | 2/2004 | Thomson et al. | |
| 2004/0034669 A1 | 2/2004 | Smith et al. | |
| 2004/0064487 A1 * | 4/2004 | Nguyen et al. | 707/204 |
| 2004/0068509 A1 * | 4/2004 | Garden et al. | 707/100 |
| 2004/0073567 A1 | 4/2004 | Pelon | |
| 2004/0088297 A1 | 5/2004 | Coates et al. | |
| 2004/0091114 A1 | 5/2004 | Carter et al. | |
| 2004/0153459 A1 * | 8/2004 | Whitten et al. | 707/10 |
| 2004/0182225 A1 * | 9/2004 | Ellis et al. | 84/476 |
| 2004/0215584 A1 | 10/2004 | Yao | |
| 2004/0260696 A1 | 12/2004 | Matsuoka et al. | |
| 2005/0015386 A1 * | 1/2005 | Mortensen et al. | 707/100 |
| 2005/0125436 A1 | 6/2005 | Mudunuri et al. | |
| 2005/0131970 A1 | 6/2005 | Salazar et al. | |
| 2005/0235271 A1 * | 10/2005 | Sanyal et al. | 717/136 |
| 2005/0256908 A1 | 11/2005 | Yang et al. | |
| 2007/0179939 A1 | 8/2007 | O'Neil et al. | |

FOREIGN PATENT DOCUMENTS

| | | |
|---|---|---|
| EP | 1 170 662 A2 | 1/2002 |
| WO | WO 02/05116 A2 | 1/2002 |
| WO | WO 02/07037 A1 | 1/2002 |
| WO | WO 02/097676 A2 | 12/2002 |
| WO | WO 03/014928 A2 | 2/2003 |
| WO | WO 03/062983 A2 | 7/2003 |

OTHER PUBLICATIONS

IBM Corp., "Conditional Container Reuse for Database and Tablespace Restore," IBM Technical Disclosure Bulletin, vol. 39, No. 12, Dec. 1996, XP-002240529, pp. 199-200.

R. W. Dey, et al., IBM Corp., "Data Space Manager," IBM Technical Disclosure Bulletin, vol. 25, No. 11A, Apr. 1983, XP-000714243, pp. 5456-5459.

Oracle Corporation, "Oracle9i Application Server: Business Intelligence Technical Overview," Jun. 2003, An Oracle White Paper, http://otn.oracle.com/products/bi/pdf/bi_overview.pdf, pp. 1-13.

Oracle Corporation, "ETL Processing with Oracle9i," Jun. 2001, An Oracle White Paper, http://otn.oracle.com/products/bi/pdf/bi_overview.pdf, pp. 1-18.

Oracle Corporation, "Oracle9i for e-Business: Business Intelligence," Jun. 2001, An Oracle Technical White Paper, http://otn.oracle.com/products/oracle9i/pdf/o9i_bi_twp.pdf, pp. 1-18.

Oracle Corporation. "Oracle 9i Warehouse Builder, Architectural White paper" Jan. 2003, http://otn.oracle.com/products/warehouse/pdf/OWB_Architecture_WhitePaper.pdf, pp. 1-16.

Current Claims in PCT application, International Application No. PCT/US03/23747, 14 pages.

International Searching Authority, "Notification of Transmittal of the International Search Report or the Declaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

Oracle Corporation, "Advanced Analytic Services," 1996-2001, Oracle9i Warehousing Guide, Release 1 (9.0.1), Part No. A90237-01, http://download-west.oracle.com/docs/cd/A91202_01/901_doc/server.901/a90237, data retrieved Aug. 6, 2004, pp. 1-5.

Oracle Corporation, "Transforming Tables into Multidimensional Data Structures," 1996-2001, Oracle9i OLAP Services Concepts and Administration Guide, Release 1 (9.0.1), Part No. A88755-01, http://

(56) References Cited

OTHER PUBLICATIONS download-west.oracle.com/docs/cd/A91202_01/901_doc/olap. 901/a88755/, data retrieved Aug. 6, 2004, pp. 1-3.
Oracle Corporation, "Understanding the OLAP API," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.
Oracle Corporation, "Controlling the Flow of Execution," 1996-2001, Oracle9i OLAP Services Developer's Guide to the OLAP DML, Release 1 (9.0.1), Part No. A86720-01, http://download-west.oracle.com/docs/cd/A91202_01/901_doc/olap.901/a86720/, data retrieved Aug. 6, 2004, pp. 1-4.
Current Claims of International Application No. PCT/US2004/025805, 8 pages.
International Searching Authority, "Notification of Transmittal of the International Search Report and the Written Opinion of the International Searching Authority, or the Declaration," dated Dec. 3, 2004, 12 pages.
International Preliminary Examining Authority, "Notification of Transmittal of International Preliminary Report on Patentability," PCT/US2004/025805, dated Nov. 18, 2005, 16 pages.
R. Hugo Patterson et al., "Informed Prefetching and Caching," ACM 1995, pp. 79-65.
S. G. Shiva, et al., "Modular Description/Simulation/Synthesis Using DDL," 19$^{th}$ Design Automation Conference 1982, IEEE Press, pp. 321-329.
Israel Spiegler, "Automating Database Construction," ACM SIGMIS Database, vol. 14, Issue 3, Spring 1983, pp. 21-29.
"Optimizing Development Productivity Using UML in Oracle9iJ Developer," Oracle, Dec. 2001, 21 pages.
"UML Distilled Applying the Standard Object Modeling Language,", Martin Fowler et al., 1997, whole book.
"Object-Oriented Modeling and Design," James Rumbaugh et al., Nov. 14, 1990, pp. 366-396.
Jeffrey S. Chase, et al., "Dynamic Virtual Clusters in a Grid Site Manager," Proceedings of the 12$^{th}$ IEEE International Symposium on High Performance Distributed Computing (HPDC '03), 2002, IEEE, pp. 90-100.
Henry Song, et al., "Browser State Repository Service," Lecture Notes in Computer Science, vol. 2414, 2002, pp. 1-14, XP002904339.
Eric Skow, et al., "A Security Architecture for Application Session Handoff," 2002, IEEE International Conference Proceedings, Apr. 28-May 2, 2002, vol. 1 of 5, pp. 2058-2063, XP010589848.
International Searching Authority, "Notification of Transmittal of the International Search Report and the Written Opinion of the International Searching Authority, or the Declaration," PCT/US2004/026405, dated Jan. 6, 2006, 13 pages.
International Searching Authority, "Notification of Transmittal of the International Search Report and the Written Opinion of the International Searching Authority, or the Declaration," PCT/US2004/026389, dated Aug. 4, 2005, 13 pages.
European Patent Office, "International Preliminary Report on Patentability," Aug. 26, 2005, PCT/US2004/026570, dated Aug. 26, 2005, 9 pages.
International Searching Authority, "Notification of Transmittal of the International Search Report and the Written Opinion of the International Searching Authority, or the Declaration," PCT/US2004,026445, dated Aug. 25, 2005, 12 pages.
Spalding Office Systems, "DocuWare Document Server Specifications," Sep. 2, 2003, http://web.archive.org/web/20030902215629/http://spaldingoffice.com/includes/static-documents/site/docuData/docserverspec.htm/, retrieved on Feb. 6, 2007, 2 pages.
Naude, Frank, "Oracle FAQ: Glossary of Terms," Feb. 28, 2001, http://web.archive.org/web/20010228061218/http://www.orafaq.com/glossary/faqlosr.htm, retrieved on Feb. 6, 2007, 3 pages.
Microsoft Corporation, Migrating your Access Database to Microsoft SQL Server 7.0, Feb. 1999, http://msdn2.microsoft.com/en-us/library/aa226083(sql.70).aspx, retrieved on Feb. 6, 2007, 8 pages.
Software Resource International, "Application Migration Services," Aug. 5, 2002, http://www.softresint.com/pub/SPD/01-04-012.pdf, 2 pages.
Swierk, Edward et al., "The Roma Personal Metadata Service," Oct. 2001, http://.hpl.hp.com/personal/Mary_Baker/publications/ROMA-WMCSA2000.pdf, pp. 1-10.

\* cited by examiner

CROSS PLATFORM TRANSPORTABLE TABLESPACES

CROSS REFERENCE TO RELATED APPLICATIONS AND PRIORITY CLAIM

This application claims benefit of Provisional Application No. 60/571,088, entitled "Cross Platform Transport Tablespaces" filed May 14, 2004 by Wei Hu, et al., the entire contents of which are hereby incorporated by reference as if fully set forth herein, under 35 U.S.C. §119(e).

The present application is related to U.S. application Ser. No. 08/865,693, entitled "Tablespace-Relative Database Pointers", filed on May 30, 1997 by William H. Bridge, Jr., et al., the contents of which are herein incorporated by reference and referred to as Tablespace-Relative Database Pointers.

The present application is related to U.S. application Ser. No. 09/675,195, entitled "Using Transportable Tablespaces for Hosting Data of Multiple Users", filed on Sep. 29, 2000, by Juan R. Loaiza, et al., the contents of which are herein incorporated by reference.

The present application is related to U.S. application Ser. No. 08/852,968, entitled "Pluggable Tablespaces", filed on May 8, 1997, by William H. Bridge Jr., et al., the contents of which are herein incorporated by reference and referred to as Pluggable Tablespaces.

FIELD OF THE INVENTION

The invention is related to the field of transferring data. More specifically, the invention is related to the field of transferring data between databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, unless otherwise indicated, it should not be assumed that a problem has been recognized by the prior art merely because the problem is discussed in this section.

The ability to store and retrieve large amounts of data is one of the most important functions of computers in today's society. To carry out these functions, database systems are typically used to retrieve and store data in databases. Database systems have performed these functions very successfully, creating for society the ability to retrieve data at speeds and quantities previously unimagined, and bestowing onto society an unprecedented level of access to information. The success of database systems has unleashed an insatiable demand for even faster and more efficient database systems that process even greater quantities of data.

One mechanism that provides efficient access to large amounts of data is a data warehouse. A data warehouse represents a transformation of raw data. The raw data used by the warehouse typically comes from a "source" database system, such as an Online Transaction Processing ("OLTP") database. The OLTP database system is oriented towards the "real time" operation of a business, while the data warehouse is oriented toward answering longer range, management oriented, questions about the business. To stay current, the data warehouse house is periodically updated with information from the OLTP database system. These updates entail transfers of large quantities of data. Additionally, it may be desirable to move a database to a lower cost platform. Some other situation in which data may need to be transferred are database replication, instantiation, and migrations.

Typically, to achieve data transfer, databases offer utilities that allow data to be extracted from the source database objects into intermediate files that can be reprocessed to insert the data into the database objects at the target database. In contrast, a novel technique that is more efficient than many other conventional techniques for transferring data is referred to as transportable tablespaces. A tablespace is a logical collection of database objects that reside in physical storage containers (e.g., data files). In this specification the word "physical" refers to storage at a disk level. For example, a file is a physical entity since it represents a byte stream that actually resides on physical medium such as a disk or tape subsystem. The word "logical" refers a grouping of related objects that may be physical, logical, or a combination of both. For example, an application view of the database is "logical", because the application interacts with the database as a collection of relational objects, such as related tables and indexes. The application view does not interact with the database as physical files. Database objects are objects managed by a database system. Transportable tablespaces is a technique that allows tablespaces to be copied and integrated into another database system, or in other words, attached (e.g., "plugged in") to the other database system. With respect to a tablespace, database, and database server, the term "attach" refers to configuring a database and/or database server so that the database objects in the tablespace are incorporated within the database and the tablespace is used to store data for the database.

In contrast to repopulating the data at the row level, configuring a database to attach a tablespace involves modifying database metadata so that the tablespace and database objects associated with the tablespace are defined to be as part of the database and incorporating storage containers into the database for holding the database objects. The database metadata may be altered using a variety of techniques involving automated steps and/or manual steps performed by a Database Administrator (DBA). The DBA can run utilities available on the source database system that may be executed to export the metadata into a "metadata dump file", and run utilities on the target database system to construct metadata from the metadata dump file. Alternatively, metadata can be included with the data being transported in the tablespace, and the target database would reconstruct the metadata from the metadata included in the tablespace. The DBA can also manually reconstruct the metadata on the target database system. Using the process of attaching tablespaces allows data to be copied using operating system utilities for copying files, which copy the physical bits and runs much faster than the process of extracting and loading data by executing queries and insert statements.

Unfortunately, prior to this specification there was no known method of transporting a tablespace from a "source database system" to a "target database system" having different formats. The differences in the physical layout of the on-disk data structures containing the data complicates the transport. In this specification the word "physical" refers to storage at a disk level. For example, a file is a physical entity since it represents a byte stream that actually resides on physical medium such as a disk or tape subsystem. As another example, a data structure is an abstract type that can contain members such as integers, floats, and character arrays. If a data structure member representation takes n bytes on system 1 but m bytes on system 2 (where n is not equal to m) then the physical layout of the data structures are not identical. Additionally, if a data structure member is not aligned at the same offset from the start of the data structure between system 1 and system 2 then the on disk structure format of the two systems are not identical. The physical layout of data structures could differ based on the computer system's architecture and the endian (byte ordering) representation, for example. Typically, transferring tablespaces could be performed easily if the source database system and target database system ran on the same platform, that is, the database systems ran the same version of the same software product and on same operating system product or version. The term format includes two parts, which are structure and presentation. The term structure describes sizes and shapes and in some implementations the structures are platform-independent. Presentation describes how a particular type of data is presented. The term "structure" should not be confused with the term "data structure". Data stored in a particular "data structure" may be have a platform specific presentation. The term platform is used herein to refer to a computer system running a particular database product version and operating system product. A computer running Oracle's 10 g database server product for UNIX is a different platform than a computer running Oracle's 10 g database server product for Windows NT. An Oracle 10 g tablespace created on UNIX would have a different on-disk format than the same tablespace created on Windows NT. Transferring tablespaces could only be performed automatically if the source database system and target database system ran on the same platforms.

For moving data across-platforms, utilities such as Export/Import or Datapump are used. A conventional technique for implementing the Export/Import operations is the command generation technique. Under the command generation technique, an "Exporting" database system generates a file of insert commands. The insert commands conform to a database language, such as the structured query language ("SQL"). For each record being exported, an insert command specifies the creation of a record with the values needed to generate a copy of the record being exported. To import the data, an "importing" database system, which is capable of executing commands written in the database language, scans the file, executing each insert command.

However, Export/Import or Datapump operations are very slow since they need to process the data one row-at-a-time. Executing an insert command for each record being exported is typically a slow process, which may span days for larger databases as a result of processing the data one row-at-a-time. While data is being exported, access to the data is restricted, and users may need to tolerate a lengthy downtime. Consequently, the database user, who requires access to the data, may be significantly impacted while data is being exported. Similarly, data dump operations also rely on processing the data logically one row-at-a-time. In some cases, Export/Import and Datapump operations are too slow to meet user needs, and the associated traditional Export and/or dump files require a large amount of storage space. Thus, conventional techniques for exporting data may be significantly burdensome.

In view of the above, there is a need for a more efficient method of transferring tablespaces between databases.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for transporting data between systems is described. In the following description, for the purposes of explanation, numerous specific details are set forth in order to provide a thorough understanding of the present invention. It will be apparent, however, that the present invention may be practiced without these specific details. In other instances, well-known elements and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Functional Overview

Approaches are described for cross-platform transportation of tablespaces, in which tablespaces are transported between database systems that use different on-disk formats for the same or corresponding on-disk data. The on-disk data includes user data and meta-data. It is efficient and desirable to use identical formats for user data on different platforms. It is not efficient and very undesirable to use the same formats for meta-data, because of performance, code complexity and other reasons. This makes database files on different platforms incompatible, and requires database file conversion when a file is moved across platforms. To get the source on disk format to look like the target on disk format, a conversion method is required. In an embodiment a block may contain a mixture of platform-specific and platform-neutral data elements. Only the platform-specific elements are converted. In an embodiment each row may contain platform specific representations. In another embodiment, only the metadata in the block is in platform-specific format. As an optional optimization, where possible all headers are kept in a common format so that the number of elements that need to be converted is reduced.

Additionally, in an embodiment, a database system uses a common format that provides a common structure and structural layout but does not necessarily provide a common endian ordering for on-disk data structures. In this embodiment, a conversion schemes may still be required to address endian ordering. By providing common structural layout, the common format reduces code complexity by simplifying conversion algorithms to handle endian ordering only. Additionally, by using a common format, each platform is only required to understand two formats (its own native format and the new common format) instead of each platform being required to recognize all other platform formats. The other on-disk formats (i.e. besides the common format) are referred to herein as native (or platform specific) on-disk formats. The on-disk data structures formatted according to a native on-disk format can be converted into the common format. The common format allows, but does not require, the on-disk data structures converted from the native on-disk format to the common format to be capable of being converted back from the common format to the original native on-disk format. In other words, in an embodiment, in addition to files from other formats being converted into the common format, the on-disk data structures may also be converted back to any original format without loss of features, functions, or information associated with the format into which the file is being converted.

In the approaches described for cross-platform transportation of tablespaces, a tablespace is transported from the source database system to a target database system that uses a common on-disk format. The on-disk data structures in the tablespace may be converted from the source on-disk data format to the common format before being attached to the target database system.

On-Disk Data Structures

On-disk data structures include data structures that are used to hold user data and metadata. User data is the data that is stored and managed on behalf of end-users. On-disk structure metadata is data that describes the on-disk data structures. On-disk structure metadata may also be comprised of on-disk data structures. Examples of on-disk data structures include an operating system file, a data block, a time stamp, and pointer offsets. A data block is an atomic unit of storage space allocated to store one or more database records (e.g., rows). Typically, a database system is configured to read and write database records from persistent storage and volatile memory in units no smaller than data blocks. A file formatted according to one on-disk format may have a file header. According to an embodiment, a header is one of the initial data blocks in a file. File headers on different platforms may have different attributes. For example, one platform can have an offset N that must be skipped before accessing the actual data that is considered relevant. On another platform the offset may be 0 or another number different than N.

Data blocks may also have headers. A data block header for one on-disk format may include attributes not included in the data block header of another on-disk format, or may include attributes that correspond to an attribute in another on-disk format but that are not used by or may have a different data type than the corresponding attribute in the other on-disk format. In an embodiment, transportable tablespaces may be converted relatively quickly, because only the per-block metadata is converted and not the row data itself. In this embodiment, the row data is already in a common format that is endian-ness neutral. In an endian-ness neutral format, the same endian format is always chosen to represent the same data regardless of the endian-ness of the system. In an endian-ness neutral format the data will always be interpreted in the endian-ness that the data was written. In an embodiment, only the metadata in the block is in platform-specific format. Consequently, in this embodiment, block-at-a-time processing may be performed. In an embodiment a block may contain a mixture of platform-specific and platform-neutral data structures, and only the platform-specific structures are converted. In an alternative embodiment, each row may include some non-platform specific data, and the table space may be processed on a row-by-row basis. In an embodiment, the amount of row-by-row processing necessary may be relatively small.

Some on-disk data structures that reside on different operating system platforms may have on-disk formats with identical attributes and data types. However, different operating systems may use different ways of representing data types. On-disk formats for different operating systems may include an offset pointer represented by a pointer typed as a double byte integer. The on-disk format for one operating system may use a large endian notation to represent the integer, while the on-disk format for another operating system may use a small endian notation to represent the same integer data type.

As an example of the common structure and according to approaches for cross-platform transportation of table spaces described herein, the tablespaces of a source database are converted from the source on-disk data structure to the common data structure, unattached, converted at the source or target database, and finally attached to a target database system. The conversion may be performed at either the source database system or target database system, for example.

In an embodiment, the cross platform transportation of tablespaces allows the transport to be performed at a logical level and thereby facilitates preserving the data integrity while transporting the table spaces. In an embodiment, the cross platform transportation of tablespaces allows the movement of tablespaces among computers of different hardware and/or software architectures, running different database system products or product versions and having different on-disk data structures. Consequently, in an embodiment, when a user wants to move databases to lower cost platforms, the user may no longer be faced with a lengthy downtime by using cross-platform transportable tablespaces. In an embodiment, structural differences are removed, and therefore conversions of the structures between platforms are not required. Only the representations need to be converted. Accordingly, conversions between platforms may be performed at speeds that are an order of magnitude faster. In an embodiment, row data are kept essentially platform-independent and thus row level conversion is not usually required. In an embodiment, high performance parallel algorithms are used to process conversions. For example, in an embodiment, the only row level processing necessary are (1) if the row length of the row level meta data longer than a particular length (e.g., 253 bytes), the length needs to be shortened, and/or (2) if data or new data types are introduced that are not platform-independent. In an alternative embodiment, no row level processing is necessary.

An Embodiment of a Method for Transporting Tablespaces Across Platforms

Figure 1:
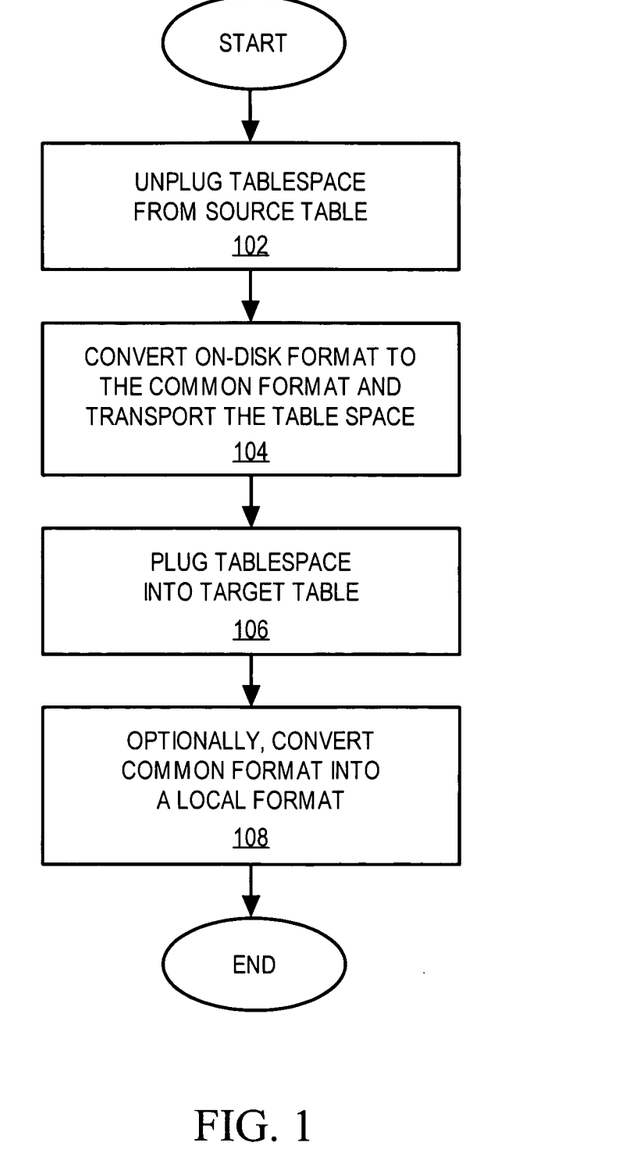
FIG. 1 is a block diagram of a flowchart for a method of transporting data between two systems.

FIG. 1 shows a flowchart of a method 100 for transporting tablespaces across platforms. In step 102, a tablespace from a source database is unattached. In step 104, a command is run for converting the on-disk format and/or other format of the tablespace to a target format. The conversion may be performed at the source database system or at the target database system. For example, all data structures may be placed into a target format, except for those data structures that are required to be in a particular platform dependent format for efficient access. In an embodiment, a common format is defined such that it can be attached by all platforms. In this case, the target format of the conversion is the common format. In an embodiment, the contents of the rows may be platform independent. Additionally, the on-disk structure metadata in the block may be platform specific and stored in a local endian order. In an embodiment, on-disk structure metadata may be converted one block-at-a-time, because block-at-a-time conversion can be performed faster than converting the entire set of blocks of on-disk structure metadata in other manners. In an alternative embodiment, the tablespaces may be converted on a row-by-row basis, as discussed earlier.

In an embodiment, hierarchical conversion macros may be generated at compile time in order to describe conversion methods of the blocks. When the convert utility is run, the convert utility looks up the conversion methods that were created by the macros and invokes the conversion. On disk structures may be registered with a database system using the hierarchical conversion macros. The hierarchical conversion macros may automatically generate conversion routines for existing on-disk data structures. The conversion macros may also be used to generate on disk data structures. The hierarchical conversion macros may define on-disk structures and create conversion routines. The hierarchical conversion macros or the conversion routines created by the hierarchical conversion macros may rearrange data depending on the type of the data. Specifically, macros or routines are defined that specify how to convert each data type. However, it is possible that a first data type, T1, contains a second data type, T2. In such a case, a conversion macro or a conversion routine is defined for converting data type T2. Additionally, a hierarchical conversion macro or a conversion routine is defined for converting data type T1. However, the hierarchical conversion macro or conversion routine for data type T1 does not need to specify how to convert data type T2, but may use the conversion macro or conversion routine for data type T2.

The block-at-a-time or row-by-row conversion can be done dynamically, and therefore a single tablespace (e.g., a read-only table space) may be shared among, and mounted on (e.g., attached), computers of different byte ordering (e.g., big endian and little endian order). Each block or row is converted as it is read (dynamically).

Conversion of certain data structures may be performed on-demand. In an embodiment, all the file headers are placed into the same format, so that the files may be identified, facilitating auto-recognition. In an embodiment, a platform identifier, included in the header, may be used for auto-recognition of the platform that the file came from. Consequently, it can be said that the common platform files are "self-aware" of the format from which they originated or are "self-identifying".

In step 106, the tablespace is attached to the target database. The tablespace is now usable at the target database in the common format. Optionally, in step 108, the tablespace may be converted from the common format to another format associated with the target database system.

An Example of a System in which a Tablespace is Transported

Figure 2:
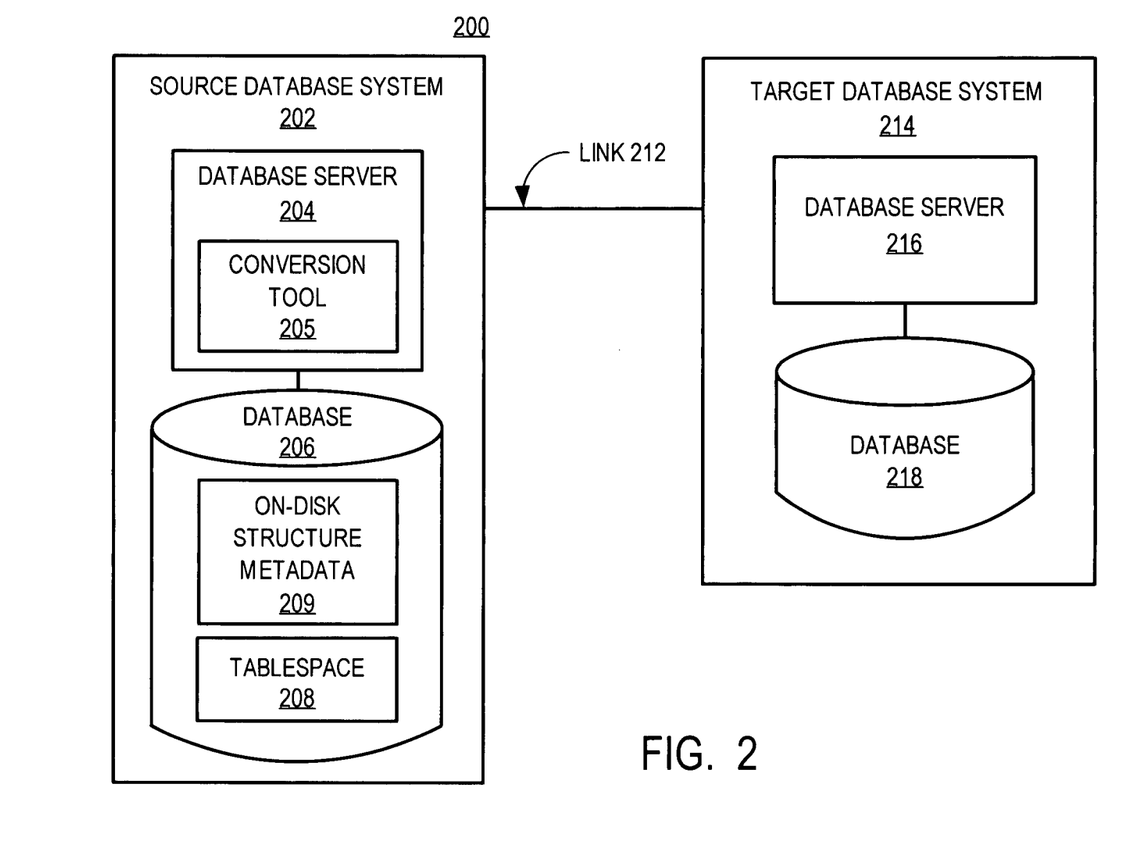
FIG. 2 is a block diagram of a system for implementing the method of FIG. 1.

FIG. 2 is an example of a system 200 upon which method 100 may be carried out. System 200 includes a source database system 202 having database server 204, which includes conversion tool 205. Source database system 202 also includes database 206 with tablespace 208, which is associated with on-disk structure metadata 209. System 200 may also include a link 212 and a target database system 214 having database server 216 and database 218. Alternative embodiments may not include all of the components listed or may include other components in addition to or instead of those listed above.

Source database system 202 may be a machine or network of machines supporting a source database. The source database system 202 is the source of the tablespace that needs to be transferred.

Database server 204 is the software that accesses the source database. Queries and other database commands are submitted to database server 204, which processes the commands and returns or manipulates data in the source database in response to the database commands. Conversion tool 205 converts the tablespace and on-disk structure metadata associated with the tablespace into the common format.

Database 206 is the source database that contains the tablespace that needs to be transported. Tablespace 208 is the tablespace that needs to be transported.

Target database system 214 is the target database system to which tablespace 208 is transported via link 212 from source database system 202. Database server 216 is the software that accesses the target database. Queries and other database commands are submitted to database server 216, which processes the commands and returns or manipulates data in the target database in response to the database commands. Database server 216 may have a conversion tool instead of or in addition to conversion tool 205. Database 218 is the target database to which tablespace 208 is transferred.

Common On-Disk Data Structures

The common format may include common on-disk data structures that use one common endian order, and one common set of on-disk structure metadata. In converting a system's tablespaces and/or data files to the common on-disk file format, the endian order may need to be modified, and on-disk structure metadata may need to be modified to another machine format, for example. Some types of words or structures may be allocated a different quantity of bits and/or bytes in different formats. Since the on-disk data structures may have different sizes, the offset pointers to on-disk data structures may also be changed.

In an embodiment, the common format includes a common file header. For example, the file header may take up one data block and may be located at an offset having the value zero (indicating the offset from the beginning of the file). A data block may be a group of data (e.g., records) that are transferred together as one unit. In an embodiment, a common format header does not have on-disk structural differences in the file header. The lack of on-disk structural differences in the file header allow different platforms to interpret the differences in the platform attributes.

Backwards Compatibility

In an embodiment, in addition to files from other formats being converted into the common format, the on-disk data structures may also be converted back to any original format without loss of features, functions, or information associated with the format into which the file is being converted. Thus, after converting to the common format, the user may still return to any of the other formats, and use a legacy database that uses the format. As long as all formats can be converted from their original format to the common format and back, backwards compatibility can be maintained. In an embodiment, the user is given a mechanism for choosing whether to maintain backwards compatibility. If the mechanism is set in the target database system to maintain backwards compatibility, the database system cannot introduce any features that will not be able to be converted to the original source on-disk format. In an embodiment, when maintaining compatibility, any operation that can be performed in the common format can also be performed in the original format.

Conversion Tool and Process

To perform the file conversion, it may be desirable to specify a mechanism and process for performing the conversion, and to define the objects that need to be operated upon by the mechanism and process while performing the conversion.

Regarding the mechanism, each database may use the same mechanism for performing the conversion (e.g., conversion tool 205). Having each database use the same mechanism simplifies the programming. In an alternative embodiment, different mechanisms for performing the file conversion may be used by different databases. The conversion of the file format may be performed by a stand-alone tool such as conversion tool 205, or may be added as a function or object of another tool. For example, a portion of code for performing the file conversions may be added to a recovery manager or other tool that already includes many of the facilities for performing many of the functions that will be needed to perform the conversions. For example, a conversion tool may use a recovery manager's processes (e.g., Oracle's RMAN) for copying and checking files. Having conversion tool 205 use a recovery manager for copying and checking files allows conversion tool 205 to leverage the parallelism of the recovery manager and the capability of the recovery manager to handle various storage devices.

Regarding the objects that need to be operated upon, a mechanism (e.g., a compile-time macro) is included in the conversion tool 205 that declares all convertible on-disk data structures in a manner that conversion logic is automatically derived from the structural declarations of the convertible on-disk data structures. Therefore, all on-disk data structures have their conversion functions generated. Since the structures stored on a particular block of a tablespace are known, the conversion functions associated with the block can be called. The conversion logic is included in the conversion utility. In an embodiment, the RMAN processes the tablespaces on a row-by-row basis. In an alternative embodiment, the RMAN processes the data blocks of tablespaces block-by-block and/or the amount of processing per row is relatively small compared to were all the data in each row platform specific. The RMAN may be configured to convert on-disk data structures while performing the block-by-block or row-by-row processing.

In an embodiment, the conversion process has at least two parts. The first part is adding the common header, if not already present, and the second part is the actual processing of the on-disk data structures. Either of the portions of the conversion process may be performed by the source or target database system. If the conversion is performed at the target database system, it may be desirable for the target database system to include a mechanism for distinguishing the tablespaces and/or data files of foreign systems from a corrupted file, because at the time that the tablespaces and/or data files are received the tablespaces and/or data files may be still in the format of the source database system, which may not necessarily be recognized by the target database system. One way of facilitating the recognition of files is to tag the file with an identifier of the format that the file is in. Consequently, the conversion tool (e.g., conversion tool 205) may include a portion for tagging the files and a portion for reading the tags to determine which format they are in.

EXAMPLE

In an embodiment, when transporting tablespace 208 from source database system 202 to target database system 214 using method 100, tablespace 208 is unattached from database 206. Conversion tool 205 converts the on-disk format tablespace 208 into a common format. While or before converting tablespace 208, conversion tool 205 determines which structures in tablespace 208 need to be converted. The conversion to the common format may be performed at either the source database system 202 or the target database system 214 by either conversion tool 205 or by a conversion tool at the target database system. In an embodiment, on-disk structure metadata 209 is converted one block-at-a-time to the common format, and each block of on-disk structure metadata 209 is converted as it is read in and then written out in the new converted format when it is flushed from source database system 202. There may be no row specific processing necessary. Alternatively, each row may have some data that needs to be converted. Tablespace 208 (with on-disk structure metadata 209) is then attached to database 218.

In an embodiment, cross-platform transportable tablespace is faster than using tools such as Export/Import or Datapump, because the data is copied and converted at the physical level one-block-at-a-time rather than row-at-a-time or because there is relatively little row specific processing necessary. Using cross-platform transportable tablespaces, the user can easily move databases to lower cost platforms. Customers are no longer faced with a lengthy downtime if they want to move to cheaper commodity hardware.

Seed Database

In an embodiment, the auto-recognition can be used to create a universal seed database (e.g., a template for a database) that can be used across all platforms, which obviates the need to create a separate seed database for each platform (saving disk space). A seed database may be a logical integration of system data (which is fairly small and can be created by a template) and user data (which can be very large). Thus, when a user wants to create a database, the user is sent a seed database, and the conversion tool uses the information in the seed database to build the platform specific components of the database being built. Any user data that needs to be sent to the user along with the seed database may be sent in just the on-disk format, without knowledge of any local on-disk format used by the user. The conversion tool uses the auto-recognition to identify what platform the users are using and converts the data files of the template seed database to that platform. In other words, based on the self-identifying nature of the user data the conversion algorithm will be able to convert and integrate the user data into the desired platform format. Without the conversion tool, a different seed database would be needed for each platform. Additionally, without the conversion tool, if the user's platform were unknown, it may at times have been necessary to send the user data in each on-disk format.

Hardware Overview

Figure 3:
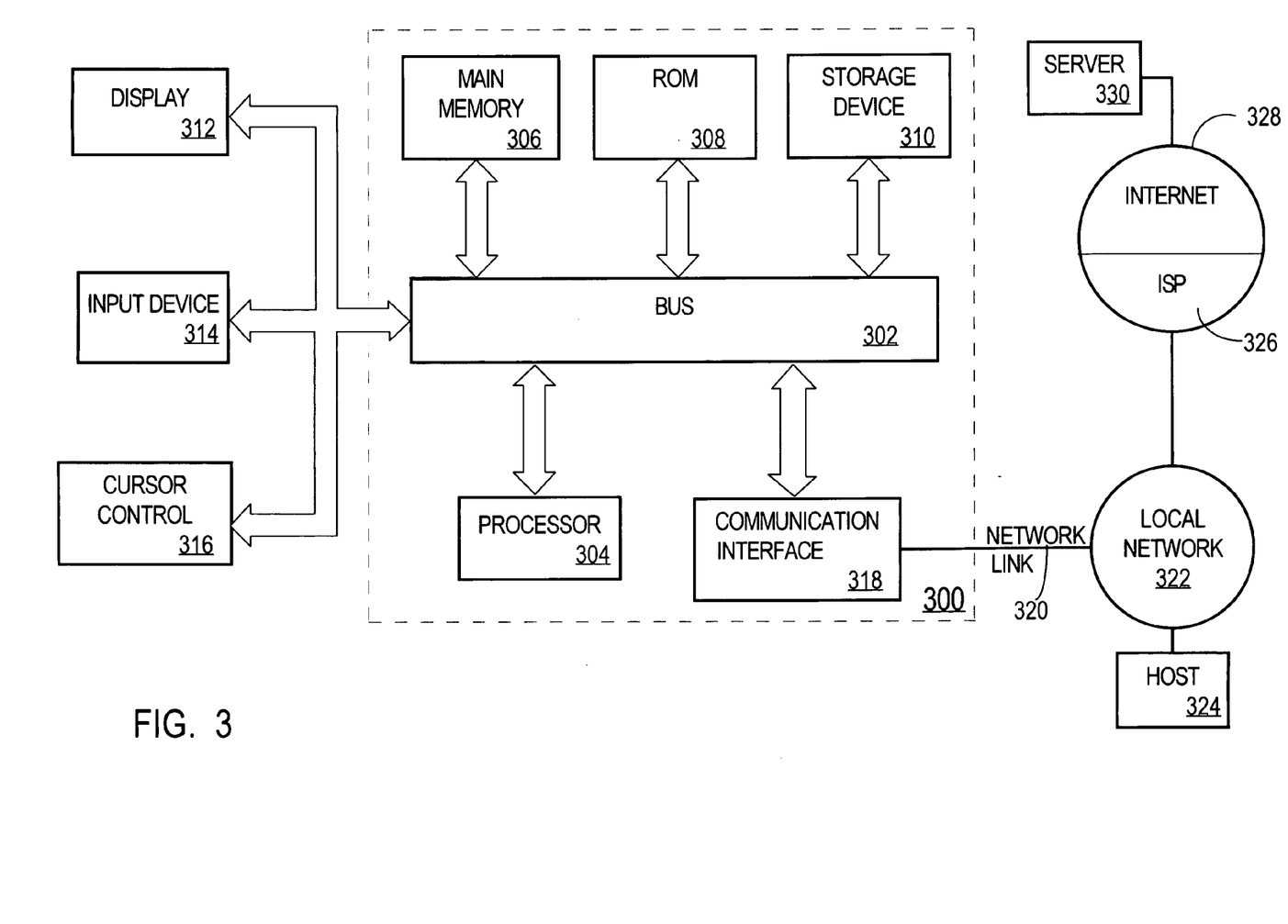
FIG. 3 is a block diagram that illustrates a computer system that may be used in implementing an embodiment of the present invention.

FIG. 3 is a block diagram that illustrates a computer system 300 upon which an embodiment of the invention may be implemented. Source database system 202 and target database system 214 may each include one or more computer systems such as computer system 300. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read-only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for transporting tablespace 208 using common data structures from source database system 202 to target database system

214. According to one embodiment of the invention, is provided by, one or more computer systems such as computer system 300, in response to processor 304 executing one or more sequences of one or more instructions contained in main memory 306, performing method 200. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for transporting tablespace 208 from source database system 202, via link 212 (which may be network link 320), to target database system 214, as described herein.

The received code may be executed by processor 304 as it is received, and/or stored in storage device 310, or other non-volatile storage for later execution. In this manner, computer system 300 may obtain application code in the form of a carrier wave. Computer 300 is just one example of a machine, and the computer-readable medium is just one example of machine-readable medium, which may be used in implementing method 100 and/or system 200.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
   converting, within a first collection of physical files, metadata contained in a plurality of database data blocks in the first collection of files from a first format to a second format;
   wherein the first collection of files includes one or more tablespaces;
   wherein converting includes, for each database data block of the plurality of database data blocks:
      reading the each database data block from a corresponding file of the first collection of files into a computer memory, the each database data block read into the computer memory having metadata in the first format,
      converting, in the computer memory, metadata of the each database data block, from the first format to the second format, and storing the converted each database data block in the corresponding file of the first collection of files, wherein metadata of the converted each database data block stored in the corresponding file of the first collection of files is in the second format;

wherein, prior to the converting, the first collection of files is attached to the first database system;

after said converting, attaching the first collection of files to a second database system;

the second database system using the attached first collection of files to store database data;

wherein the first format is compatible with the first database system;

wherein the first format is incompatible with the second database system;

wherein the second format is incompatible with the first database system;

wherein the second format is compatible with the second database system;

wherein the method is performed by one or more computing devices.

2. The method of claim 1, wherein the converting further comprises:

declaring all convertible on-disk data structures;

automatically deriving conversion functions from the declaring of the convertible on-disk data structures; and calling the conversion functions based on the convertible on-disk data structures declared.

3. The method of claim 1, wherein the converting further comprises:

adding a header associated with the second format to a file associated with the first collection of files, if the header is not already present.

4. The method of claim 3, wherein the header includes at least a platform identification that identifies a platform associated with the first system.

5. The method of claim 1, further comprising:

after the converting, copying or moving the first collection of physical files from the first database system to the second database system; and wherein the converting is performed at the first database system.

6. The method of claim 1, further comprising:

prior to the converting, copying or moving the first collection of physical files from the first database system to the second database system; and wherein the converting is performed at the second database system.

7. The method of claim 1, wherein the first format is one of big-endian byte ordering or little-endian byte ordering and the second format is the other of big-endian byte ordering or little-endian byte ordering.

8. A computer-readable non-transitory storage medium storing one or more sequences of instructions which, when executed by one or more processors, causes the one or more processors to perform:

converting, within a first collection of physical files, metadata contained in a plurality of database data blocks in the first collection of files from a first format to a second format;

wherein the first collection of files includes one or more tablespaces;

wherein converting includes, for each database data block of the plurality of database data blocks:

reading the each database data block from a corresponding file of the first collection of files into a computer memory, the each database data block read into the computer memory having metadata in the first format, converting, in the computer memory, metadata of the each database data block, from the first format to the second format, and storing the converted each database data block in the corresponding file of the first collection of files, wherein metadata of the converted each database data block stored in the corresponding file of the first collection of files is in the second format;

wherein, prior to the converting, the first collection of files is attached to the first database system;

after said converting, attaching the first collection of files to a second database system;

the second database system using the attached first collection of files to store database data;

wherein the first format is compatible with the first database system;

wherein the first format is incompatible with the second database system;

wherein the second format is compatible with the second database system;

wherein the second format is incompatible with the first database system.

9. The medium of claim 8, wherein the converting further comprises:

declaring all convertible on-disk data structures;

automatically deriving conversion functions from the declaring of the convertible on-disk data structures; and calling the conversion functions based on the convertible on-disk data structures declared.

10. The medium of claim 8, wherein the converting further comprises:

adding a header associated with the second format to a file associated with the first collection of files, if the header is not already present.

11. The medium of claim 10, wherein the header includes at least a platform identification that identifies a platform associated with the first system.

12. The medium of claim 8, further storing one or more sequences of instructions which, when executed by the one or more processors, causes the one or more processors to perform:

after the converting, copying or moving the first collection of physical files from the first database system to the second database system; and wherein the converting is performed at the first database system.

13. The medium of claim 8, further storing one or more sequences of instructions which, when executed by the one or more processors, causes the one or more processors to perform:

prior to the converting, copying or moving the first collection of physical files from the first database system to the second database system; and wherein the converting is performed at the second database system.

14. The medium of claim 8, wherein the first format is one of big-endian byte ordering or little-endian byte ordering and the second format is the other of big-endian byte ordering or little-endian byte ordering.

* * * * *